April 14, 1959     E. W. LAISNE     2,881,661
INTERCHANGEABLE NOSE GUARDS
Filed Sept. 20, 1956     2 Sheets-Sheet 1
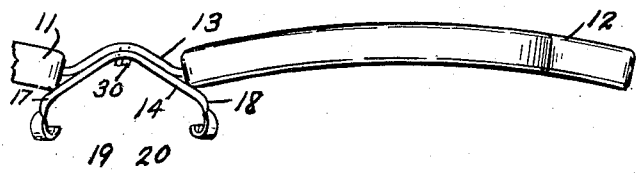
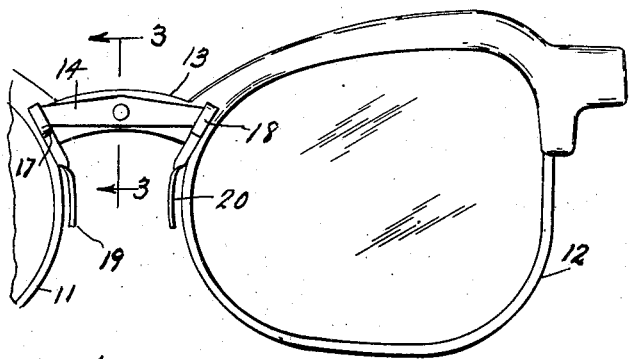
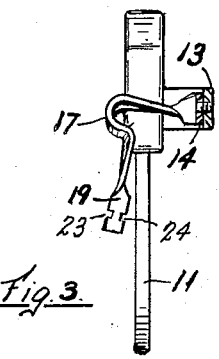
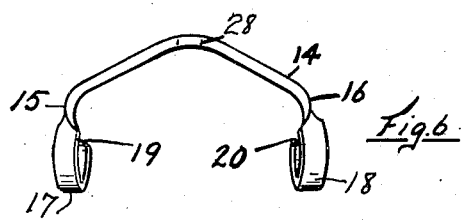
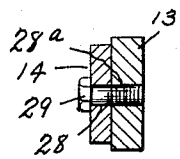
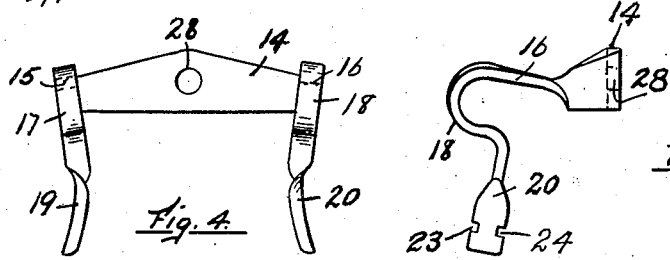
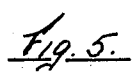
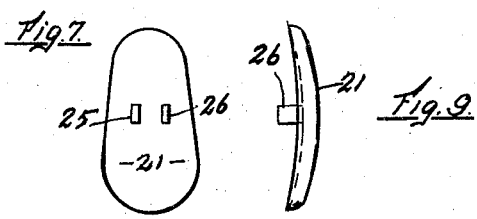
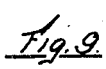
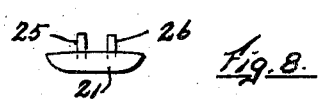
INVENTOR.
E. W. Laisne April 14, 1959 E. W. LAISNE 2,881,661
INTERCHANGEABLE NOSE GUARDS
Filed Sept. 20, 1956 2 Sheets-Sheet 2

INVENTOR.
E. W. Laisne

2,881,661
INTERCHANGEABLE NOSE GUARDS

Eugene W. Laisné, Fresno, Calif.

Application September 20, 1956, Serial No. 610,952

3 Claims. (Cl. 88—50)

This invention relates to interchangeable nose guards for eyeglass and the like frames.

Heretofore in the manufacture of eyeglass and like frames the nose guard arms have been formed as an integral part of the front either by hard soldering them to the eye wires in the case of the combination metal and plastic fronts, or molding them with the frame in the case of all plastic fronts.

In practically all cases in fitting eyeglasses adjustment of the nose guards is necessary in order to properly position and maintain the lenses before the eyes of the wearer or patient.

In the case of the combination metal plastic frames this is attempted by bending the nose guard arms towards or away from each other, towards or away from the face, up or down or a combination of such movements or adjustments requiring considerable skill and a great deal of time and even then frequently failed to prove satisfactory.

In the case of the all plastic frames the nose pads were either heated and bent to as nearly as possible fit the nose, or plastic pads were cemented superposed on the nose guards which also required considerable skill and time and also frequently failed to accomplish the desired purpose.

It is the prime object of this invention to provide a system of interchangeable nose guards capable of being easily and quickly attached to or detached from the frames and interchanged as necessary to obtain a proper fitting, these nose guards being produced in a variety of shapes and sizes most likely to fit or approximate the various features of the different patients and hold the lenses properly positioned.

Another object is to produce a devise of the above character in which any slight adjustments necessary to more closely conform to the patient's features can be easily and quickly made without the use of tools or the need for special knowledge or skill.

A still further object is to provide a device as above set out which will be simple in construction, efficient in operation and of a minimum cost of so much of manufacture.

Other objects and advantages will appear hereinafter and while I have shown and will describe the preferred form of my invention it will be understood that I do not limit myself to such preferred form but that various changes and adaptations may be made therein without departing from the spirit of my invention.

In the drawings accompanying and forming a part hereof:

Fig. 1 is a rear elevation of a pair of eyeglasses as is necessary to illustrate the application of my interchangeable nose guards thereto.

Fig. 2 is a top plan of Fig. 1.

Fig. 3 is a section on the line 3—3 of Fig. 1.

Fig. 4 is an elevation on an enlarged scale of my interchangeable nose guard detached from its place of use with the nose pads omitted for clearness of illustration.

Fig. 5 is a side elevation of Fig. 4.

Fig. 6 is a top plan of Fig. 4.

Fig. 7 is a rear elevation of one of the nose pads adapted for use with my nose guard.

Fig. 8 is a bottom plan of Fig. 7.

Fig. 9 is a side elevation of Fig. 7.

Fig. 10 is an enlarged fragmentary section illustrating the method of securing the nose guard in position for use.

Figure 11:
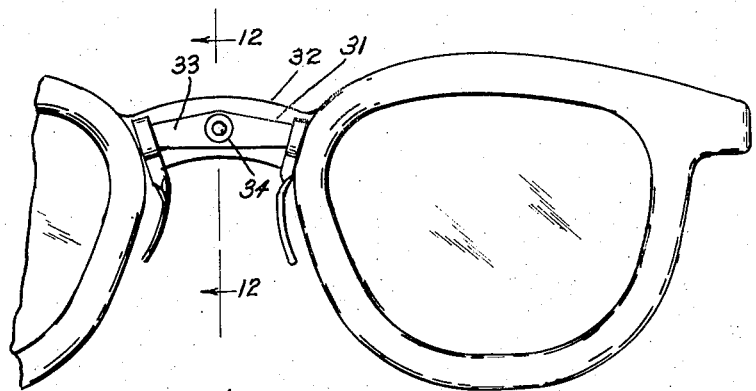
Fig. 11 illustrates my nose guard as assembled to a plastic eyeglass front.

Referring to the drawings, Figs. 1 to 10 inclusive, 11 and 12 indicate the lens frames connected together in the usual manner by the bridge 13.

As best shown in Figs. 4, 5 and 6 my interchangeable nose guard is in top plan substantially U-shaped comprising the cross bar 14 which is curved slightly at its center and then extends outwardly parallel with bridge 13 in substantial conformity with the contour thereof and then outwardly at a substantial right angle in a quarter twist to form the legs 15 and 16 and then bent or curved to form downwardly opening arcuate portions 17 and 18 the ends of which extend downwardly therefrom for a distance and have their lower ends flattened to form mountings 19 and 20 for the reception of the nose pads 21 and 22, notches 23 and 24 being provided in the edges of the mountings 19 and 20 for the reception of the prongs 25 and 26 projecting from the rear faces of the nose pads 21 and 22 which when positioned within said notches and bent over the opposite faces of the mountings towards each other act to retain said nose pads positioned for use. While I have shown but one pair of the notches 23 and 24 it will be understood that I may, if I so desire, provide two or more pairs thereof spaced along the mountings 19 and 20, the purpose of which will be obvious.

Provided centrally through the cross bar 14 is an opening 28 which registers with a similar opening 28a in the bridge 13 for the reception of a screw or bolt 29 whereby my nose guard may be easily and quickly secured to said bridge and as quickly detached therefrom. Any other suitable or desired means may be substituted for the bolt 29.

Figure 12:
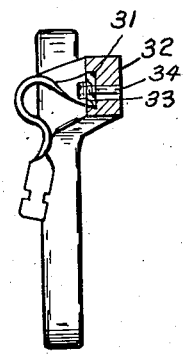
Fig. 12 is a section on the line 12—12 of Fig. 11.

In Figs. 11 and 12 I have shown my nose guard structure as applied to an all plastic frame. In this construction the nose guard structure is essentially the same as above described with the exception that a recess 31 is provided in the inner face of the bridge 32 for the reception of the cross bar 33, a bolt or screw 34 providing means for securing the bridge and nose guard structure together.

Figure 13:
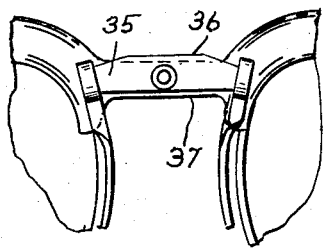
Fig. 13 is a fragmentary elevation showing another form of my invention.
Figure 14:
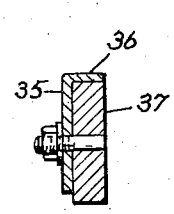
Fig. 14 is a section on the line 14—14 of Fig. 13.

In Figs. 13 and 14 I have shown another adaptation of the form shown in Figs. 1 to 10 inclusive. In this form the cross bar 35 is provided with an inturned rim or flange 36 along its upper edge which bears against the upper edge of the bridge 37. If desired or found advisable I may provide a similar flange along the lower edge or on both said edges.

In the use of my nose guard structure the eyeglass fronts will generally be produced without the usual nose guard arms.

In fitting a frame to the features of a patient the fitter or dispenser will estimate the size and shape of nose guard best suited or most closely suited to the patient. He will then assemble the same to the front. If after positioning the same upon the patient any very slight adjustment is necessary or desirable he may be bending or twisting the guard arms with his fingers easily and quickly produce the desired result.

If, however any material adjustment would be necessary the dispenser will simply make another selection and substitute it for the previous selection.

It will thus be seen that the time and effort required in interchanging the nose guard structure to obtain a perfect fitting is infinitesimal as compared to the time and effort consumed by the present method of bending and rebending the present nose guard structure.

Having described my invention what I claim is:

1. An interchangeable nose guard structure for eyeglass frames formed of a single piece of resilient material curved centrally of its length to coincide with the curvature of the inner face of the bridge of said frames and arranged to be detachably secured to said inner face the portions of said strip adjacent the ends of said bridge being bent in a quarter twisted curve to extend at a right angle from said bridge for a distance and then bent to form downwardly opening loops, the free ends of said loops being formed in a quarter twist and extending downwardly from said loops to form pad supporting arms, and pairs of oppositely disposed notches in the edges of said pad supporting arms.

2. An interchangeable nose guard structure for eyeglass frames formed of a single piece of flat ribbon like resilient material curved centrally of its length on its transverse plane to coincide with the curvature of the inner face of the bridge of said frames and adapted to be detachably secured thereto, the portions of said strip adjacent the ends of said bridge being bent in a quarter twist curve to extend at a right angle from said bridge for a distance and then bent to form downwardly opening loops, the free ends of said loops being formed in a quarter twist and extending downwardly for a distance from said loops to form pad supporting arms.

3. In combination an interchangeable nose guard structure for eyeglass frames formed of a single piece of flat ribbon like resilient material curved on its transverse plane centrally of its length to coincide with the curvature of the bridge of said frames and adapted to be detachably secured to the inner face thereof, the portions of said strip adjacent the ends of said bridge portion being curved in a quarter twist to extend at right angles for a distance therefrom and then bent to form downwardly extending loops, the free end of said loops being bent in a quarter twist and extending downwardly for a distance to form nose pad supporting arms, and nose pads upon the ends of said pad supporting arms.

References Cited in the file of this patent

UNITED STATES PATENTS

| | | |
|---|---|---|
| 566,304 | Fowler | Aug. 25, 1896 |
| 2,035,785 | Bouchard | Mar. 31, 1936 |
| 2,080,853 | Nelson | May 18, 1937 |
| 2,114,174 | Bosworth | Apr. 12, 1938 |
| 2,243,770 | Nerney | May 27, 1941 |
| 2,345,065 | Nerney | Mar. 28, 1944 |
| 2,354,603 | Malcom | July 25, 1944 |
| 2,479,754 | Marks | Aug. 23, 1949 |
| 2,643,580 | Miner et al. | June 30, 1953 |
| 2,783,681 | Lindblom | Mar. 5, 1957 |

FOREIGN PATENTS

| | | |
|---|---|---|
| 22,304 | Great Britain | of 1894 |